United States Patent [19]

Jeong

[11] Patent Number: 5,440,431
[45] Date of Patent: Aug. 8, 1995

[54] OPTICAL APPARATUS HAVING A ZOOM LENS SYSTEM

[75] Inventor: Jong-kyo Jeong, Kyeongsangnam-do, Rep. of Korea

[73] Assignee: Samsung Aerospace Industries, Ltd., Rep. of Korea

[21] Appl. No.: 124,397

[22] Filed: Sep. 20, 1993

[30] Foreign Application Priority Data

Apr. 26, 1993 [KR] Rep. of Korea .............. 93-7008

[51] Int. Cl.⁶ ............... G02B 15/14; G02B 27/00
[52] U.S. Cl. .................... 359/704; 359/513; 359/601; 359/611; 359/612
[58] Field of Search ........... 359/601, 611, 612, 425, 359/432, 694, 703, 704, 513, 422, 825, 826

[56] References Cited

U.S. PATENT DOCUMENTS

| | | | |
|---|---|---|---|
| 967,143 | 8/1910 | Arriaga | 359/694 |
| 3,951,522 | 4/1976 | Hashimoto | 359/601 |
| 4,752,798 | 6/1988 | Chrosziel | 359/612 |
| 5,033,819 | 7/1991 | Tanaka | 350/255 |
| 5,056,903 | 10/1991 | Nakamura et al. | 359/704 |
| 5,077,569 | 12/1991 | Notagashira et al. | 357/694 |
| 5,309,278 | 5/1994 | Ito et al. | 359/432 |

FOREIGN PATENT DOCUMENTS 2232269 12/1990 United Kingdom .

*Primary Examiner*—Georgia Y. Epps
*Assistant Examiner*—Michael A. Papalas
*Attorney, Agent, or Firm*—McAulay Fisher Nissen Goldberg & Kiel

[57] ABSTRACT

The optical apparatus has a pair of relatively movable lens groups which are disposed on the common axis and a light intercepting member secured to and between the two lens groups. The light intercepting member is a thin, relatively long rectangular strip which is helically wound to form a plurality of coils. In an expanded state, the coils are overlapped to prevent incident light from passing into a space between the lens groups. At the same time, the strip is elastically resilient as to maintain the spacing between the two lens groups.

13 Claims, 4 Drawing Sheets

OPTICAL APPARATUS HAVING A ZOOM LENS SYSTEM

This invention relates to an optical apparatus and more particularly to an optical apparatus having a zoom lens system.

BACKGROUND OF THE INVENTION

As is known, optical apparatus which employ a zoom lens system generally have at least two lens groups which can be moved relative to each other along a common longitudinal axis during a zooming operation. In such cases, in order to prevent incident light from passing into the space between the two lens groups, light intercepting members have been employed between the two lens groups.

For example, an optical lens system for a zoom camera generally employs a rotation movement lens barrel which is rotated clockwise or counter-clockwise by a driving means as well as a movement lens barrel which is engaged with the rotation movement lens barrel in order to move forward or rearward in response to the rotation of the rotation movement lens barrel. In addition, three lens groups are usually mounted inside the movement lens barrel along the common optical axis. For example, the first lens group is mounted in a first holder which is fixed on the inside of the movement lens barrel to move together with the movement lens barrel, a second lens group is fixedly mounted on a second holder moved by a cam and the third lens group is fixedly mounted on a third holder integrally formed with a hook hooked on a rear end of the movement lens barrel.

It has also been known to provide a spring between the first lens group and the second lens group to maintain a predetermined distance between the two lens groups when the two lens groups move relative to each other to carry out an zooming operation.

Generally, the light intercepting member for intercepting incident light is mounted between the first holder and the second holder. Such a light intercepting member is formed by two or more cylindrical rings inserted in each other to be able to slide between the first holder and the second holder.

In the conventional optical apparatus having a zoom lens, the light intercepting member and the spring are provided in the same space, that is, in the space between the first and second holders. When the zoom lens is in a retracted position, the space is at minimum and when the zoom lens is extended, the space is at maximum. However, when the space is at a minimum (the retracted state), the space cannot be less than the distance equal to the axial length of one of the rings of the light intercepting member.

In the event that the number of rings in the light intercepting member need to be increased in order to increase the maximum length between the two lens groups, it becomes difficult to house both the light intercepting member and the spring in the movement lens barrel.

In addition, since a projection is usually formed on each end part of the rings of the light intercepting member in order to keep the rings inserted within each other during a zoom operation, the external diameter of the light intercepting member becomes relatively large. In such a case, because of the limited space in the zoom assembly, increasing the number of rings of the light intercepting member become very difficult.

SUMMARY OF THE INVENTION

Accordingly, it is an object of the invention to provide a light intercepting means for an optical apparatus having a zoom lens system which is of compact construction.

It is another object of the invention to provide a light intercepting means for an optical apparatus having a zoom lens system which is capable of intercepting incident light while maintaining two relatively movable lens groups in spaced apart relation.

It is another object of the invention to provide an optical apparatus having a zoom lens system with a light intercepting means which can be extended in an axial direction in interlocking relation to a zooming operation.

It is another object of the invention to provide an optical apparatus having a zoom lens system which is simple in structure and capable of using space efficiently by using a single part to carry out two functions.

Briefly, the invention is directed to an optical apparatus having a first lens group, a second lens group disposed on a common longitudinal axis with the first lens group and means for moving the first lens group and the second lens group relative to the second lens group between a retracted position with the two lens groups in close relation and an extended position with the lens groups in zoomed out spaced apart relation. In accordance with the invention, a light intercepting means is disposed between the two lens groups to prevent incident light from passing therethrough into a space between the lens groups. In addition, the light intercepting means is elastically extendable from a retracted position thereof to an extended position thereof in association with a zooming movement of the first and second lens groups.

The elastically extendable light intercepting means not only prevents incident light from leaking into the space between the lens groups and, thus, onto a sensor or a film downstream of the lens groups but also maintains a predetermined distance between the lens groups during a zooming operation.

In one embodiment, the light intercepting means is made from a strip which is helically wound so as to have a plurality of concentric coils. Typically, the strips would be wound to have five roll parts with each roll part having an external diameter which is smaller than the next outer roll part.

The helically wound strip is disposed so that an inner one of the coils (roll part) is secured to the first lens group while an outer one of the coils (roll part) is secured to the second lens. The nature of the coil strip is that the strip is resiliently expandable along the common longitudinal axis of the two lens groups.

When in an uncoiled flattened condition, the strip has a pair of parallel longitudinal edges and a pair of transverse edges angularly disposed relative to the longitudinal edges. In addition, the strip has an edge at each end which is perpendicular to one transverse edge and which extends to one of the longitudinal edges.

The light intercepting means may also be provided with a coating of non-reflective material in order to prevent reflection of light therefrom.

The helically wound strip forming the light intercepting means can be compressed or collapsed so that the coils (roll parts) are collapsed into each other so that in the collapsed condition, the axial length of the collapsed coils is equal to the axial length of one coil (roll part). This is because the transverse edges of the strip are disposed in parallel to each other.

These and other advantages of the invention will become more apparent from the following detailed description taken in conjunction with the accompanying drawings wherein:

DETAILED DESCRIPTION OF THE PREFERRED EMBODIMENT

Figure 1:
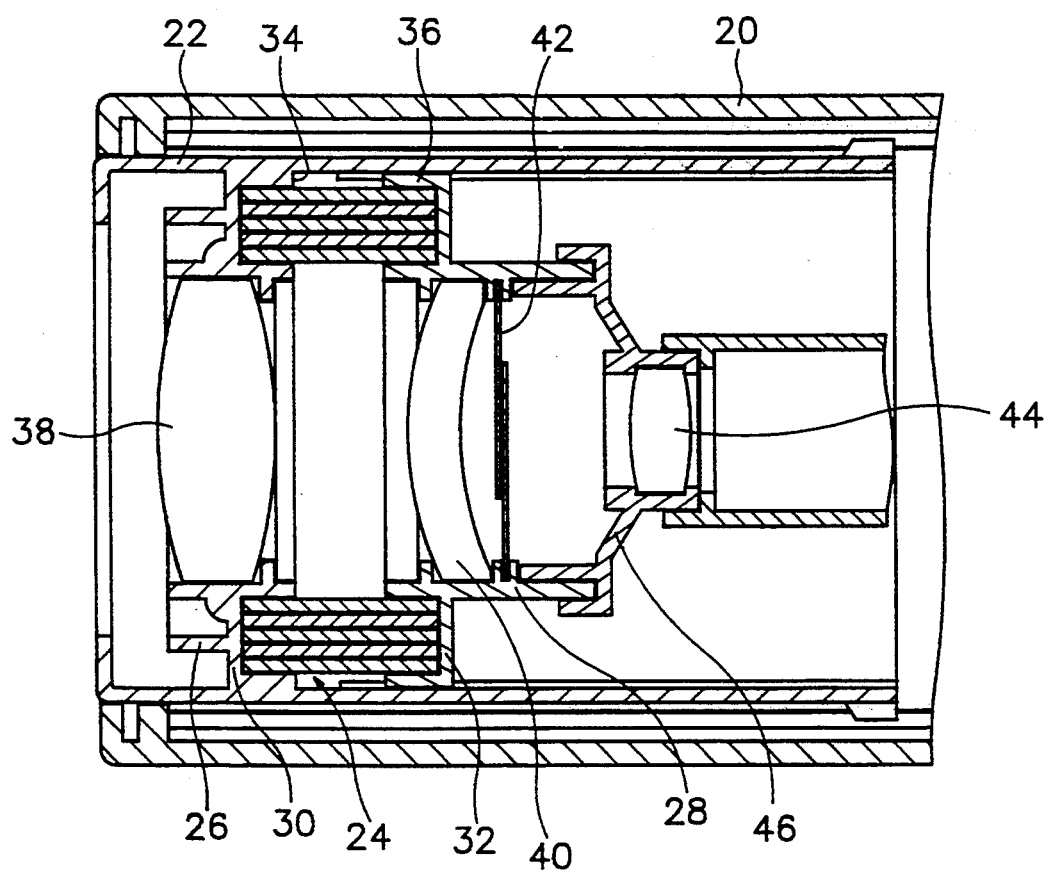
FIG. 1 illustrating a cross sectional side view of an optical apparatus employing a light intercepting means in accordance with the invention.

Referring to FIG. 1, the optical apparatus is constructed for example, for mounting on a camera body. As indicated, the optical apparatus includes a rotation movement lens barrel 20 for mounting on a camera body so as to be rotated in a clockwise or counterclockwise manner by suitable means (not shown). In addition, a movement lens barrel 22 is telescopically mounted in the rotation movement lens barrel 20 in order to move relative to the rotatable barrel 20 in response to the rotation of the rotatable barrel 20. Such a zooming operation is well known and need not be further described.

Figure 5:
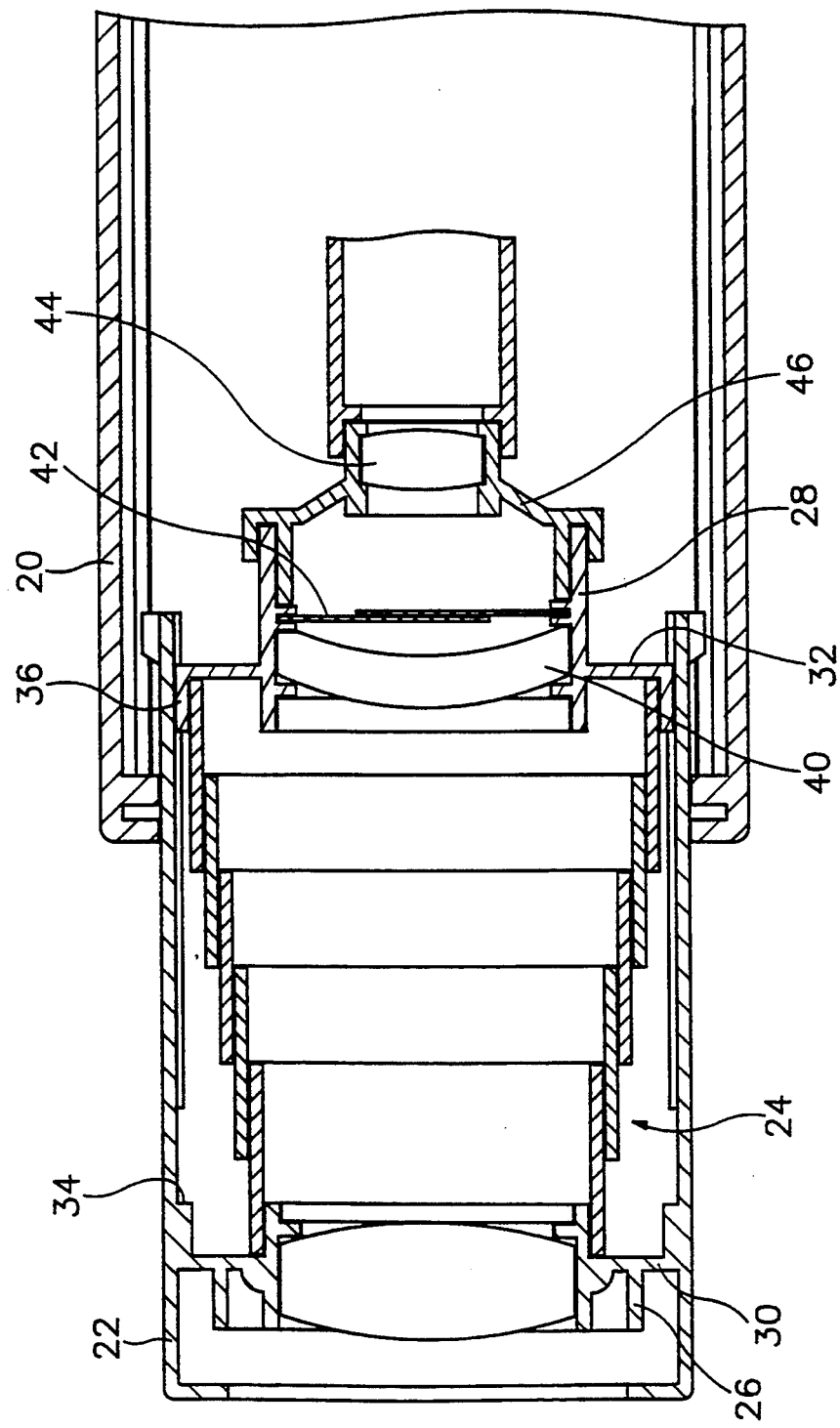
FIG. 5 illustrates a cross sectional view of the optical apparatus of FIG. 1 in a zoomed out condition.

The movement lens barrel 22 is provided with a first holder 26 which is secured at the forward end and which mounts a first lens group 38 therein. In addition, a second holder 28 is secured relative to the rotatable barrel 20 so as to maintain a fixed position and to mount a second lens group 40 therein. Thus, upon movement of the barrel 22 relative to the rotatable barrel 20, the holder 26 can be moved from an initial position which is in state before the zooming operation as shown in FIG. 1 to an outmost zooming position as shown in FIG. 5.

A shutter 42 is also coaxially aligned with the two lens groups 38, 40 while a third lens group 44 is mounted in a third holder 46 which is fixed to the second holder 28.

The movement lens barrel 22 serves a means for moving the first lens group 38 relative to the second lens group 40 between the initial position (FIG. 1) with the lens groups 38, 40 in close relation and the outmost zooming position (FIG. 5) which both the lens groups 38, 40 are spaced apart from each other.

A light intercepting means 24 is disposed between the two lens groups 38, 40 to prevent incident light from passing therethrough into a space between the lens groups 38, 40. As indicated in FIG. 5, the light intercepting means 24 is elastically extendable from the collapsed condition of FIG. 1 to the expanded condition of FIG. 5.

Figure 2:
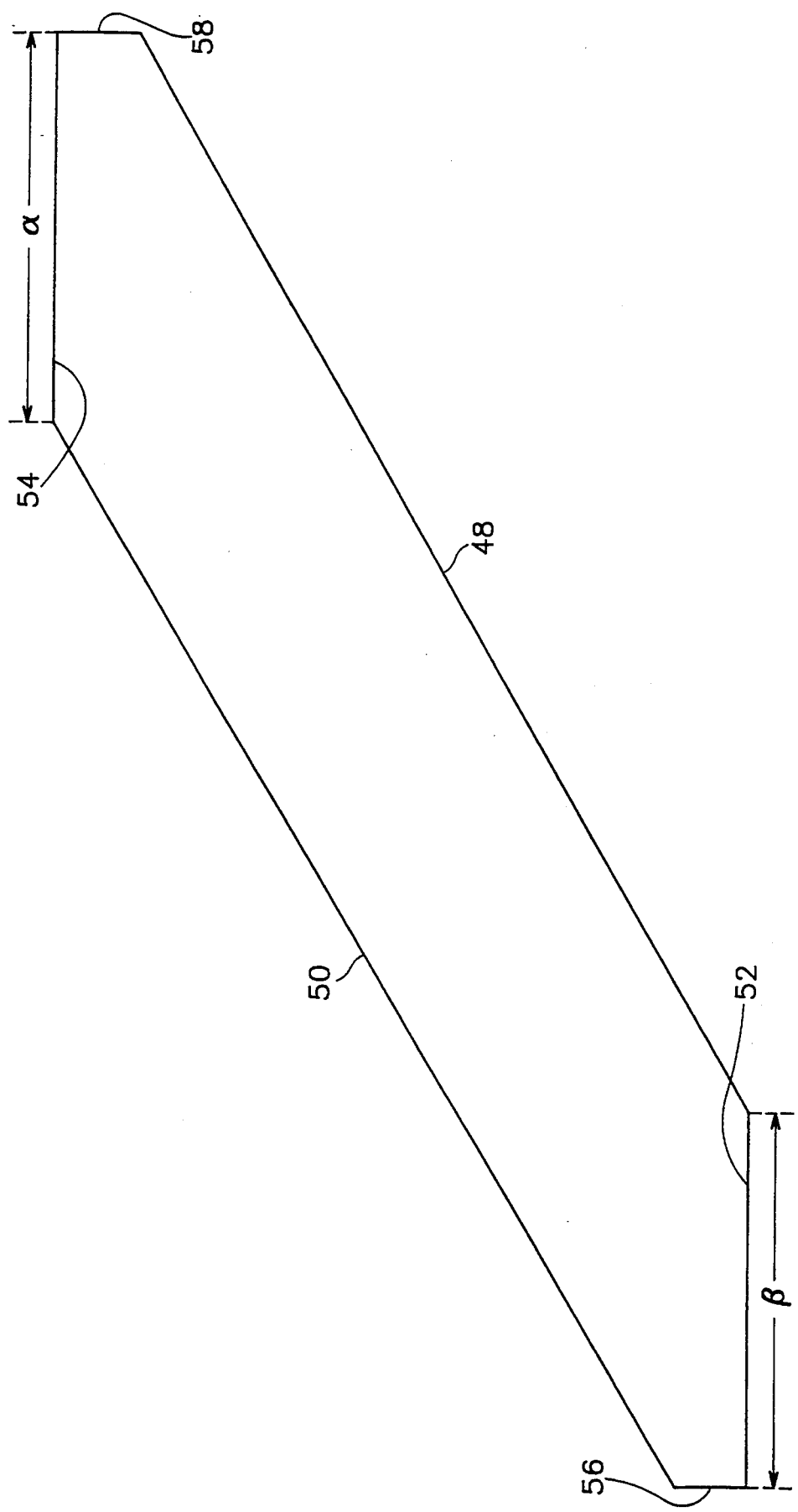
FIG. 2 illustrates a developed view of a strip forming a light intercepting means in accordance with the invention.

Referring to FIG. 2, the light intercepting means 24 is formed of a helically wound strip having a plurality of concentric coils (roll parts) with an inner one of the coils being secured to the first holder 26 of the first lens group 38 and an outer one of the coils being secured to the second holder 28 which mounts the second lens group 40. This coiled strip is resiliently expandable along the common longitudinal axis on which the lens groups 38, 40 are mounted. The light intercepting member 24 can be made of any suitable materials such as a metallic material or synthetic resin having a thin thickness and a long rectangular strip.

As illustrated in FIG. 1, the first holder 26 is provided with a radial flange 30 and a cylindrical wall 34 to define a recess within which the helically wound strip 24 is disposed. Likewise, the second holder 28 has a radial flange 32 and a cylindrical wall 36 facing the first holder 26 to receive the helically wound strip 24.

Referring to FIG. 2, when in an uncoiled flattened condition, the strip for forming the light intercepting means 24 has a pair of parallel longitudinal sides 48, 50, a pair of transverse edges 52, 54 which are angularly disposed relative to the longitudinal edges 48, 50 and which are shown horizontal in FIG. 2 and an edge 56, 58 at each end which is perpendicular to one transverse edge 52, 54 and which extends to one of the longitudinal edges 50, 48. As indicated, one transverse edge 52 has a length $\beta$ greater than the length $\alpha$ of the opposite transverse edge 54 to make an internal diameter of a first roll part 62 larger than those of the other roll parts. Accordingly, the edges 56, 58 are perpendicularly formed to the transverse edges 52, 54, so that the edges 56, 58 are of the different length as each other.

Figure 3:
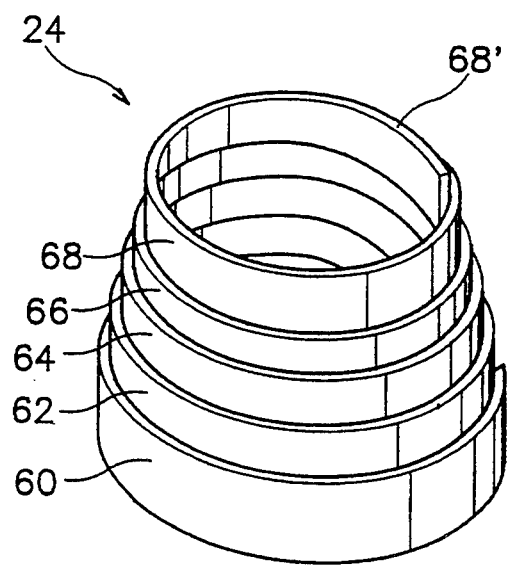
FIG. 3 illustrates a perspective view of the coiled strip in an expanded condition in accordance with the invention.

Referring to FIG. 3, when the strip of FIG. 2 is rolled up, the strip forms a plurality of helically wound coils wherein the lowermost coil has a larger diameter than the uppermost coil.

Figure 4:
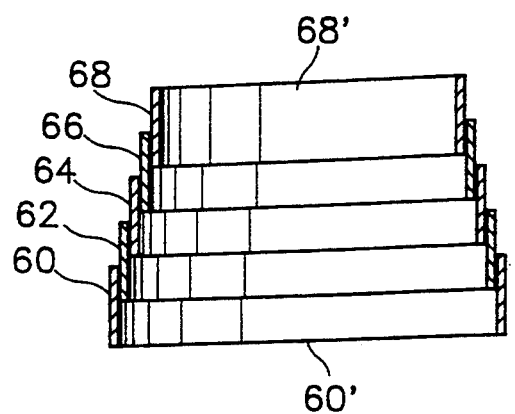
FIG. 4 illustrates a cross sectional view of the coiled strip of FIG. 3.

As shown in FIG. 4, the strip includes a first roll part 60, a second roll part 32, a third roll part 64, a fourth roll part 56 and a fifth roll part 68 which are partly overlapped with one another. As indicated, the outer diameters of the roll parts become gradually smaller from the outermost first roll part 60 to the innermost fifth roll part 68. Of note, the length of the horizontal side 52 of the flattened strip is an external diameter of the first roll part 60, and the length of the other horizontal side (transverse edge) 54 is an external diameter of the fifth roll part 68. More preferably, the horizontal side 52 is a little longer than the external diameter of the first roll part 60, and the other horizontal side 54 is a little longer than the external diameter of the fifth roll part 68' to keep an external side 60' of the first roll part 60' and an external side 68' of the fifth roll part 68 parallel to each other. When the sides 60', 68' are parallel to each other, the strip is adhered to the inside of the external flanges 30, 32 between the first holder 26 and the second holder 28, and is firmly located.

Since the light intercepting member 24 should not substantially reflect any incident light, the strip of the light intercepting member 24 has a coating of a non-reflective material to prevent reflection of light therefrom.

Referring to FIGS. 3 and 4, the light intercepting member 24 maintains the state of being extended in the axial direction of the rolls in the absence of an external force since the strip is spirally rolled up.

When compressed, the member 24 is spring biased to resiliently return to the extended state as shown in FIG. 2.

The light intercepting member 24 is elastically located between the first holder 26 and the second holder 28, as shown in FIG. 1.

FIG. 1 illustrates the state before the zooming operation is carried out wherein the first lens group 38 and the second lens group 40 are at a minimum distance from each other. If the zooming operation is carried out in this state, the rotation movement lens barrel 20 rotates relative to a fixed lens barrel (not shown) and, at the same time, the movement lens barrel 22 located in the rotation movement lens barrel 20 moves out of the rotation movement lens barrel 20. The zooming operation is well known so the structure for zooming is not shown in detail.

After a zooming operation is carried out from the state shown in FIG. 1, the state shown in FIG. 5 is achieved. At this time, the light intercepting member 24 which was elastically compressed is now extended to the axial extent of the zooming operation.

When the light intercepting member 24 is extended, the five roll parts 60, 62, 64, 66, 68 which were concentrically disposed on one another (FIG. 1) are changed into the partially overlapped state (FIG. 5).

Since the light intercepting member 24 is elastically varied, this operation can maintain the position of the two lens group 38, 40 relative to each other.

In addition, since the light intercepting member 24 includes a plurality of roll parts, even when the first lens group 38 and the second lens group 40 maintain the maximum distance from each other, the incident light from an object can be completely blocked from passing between the lens groups and the lens barrel, and becoming incident in the film direction or the sensor direction.

Since the roll parts 60, 62, 64, 66, 68 are concentrically disposed over each other in the collapsed state shown in FIG. 1, a minimum of space is required within the movement lens barrel 22. Further, unlike conventional light intercepting members using a plurality of concentric rings which require projections to prevent the rings from separating from one another during operation, no such projections are required for the coiled strip 24. In this respect, it has been found that the thickness of a conventional light intercepting member using concentric rings is more than two times as much as the coiled strip 24 of the present invention.

The strip 24 not only provides a light blocking function but also maintains the spacing between the two lens groups 38, 40. Hence, there is no need for an additional spring as in conventional optical apparatus. The ability to perform two functions allows the overall construction of the optical apparatus to be relatively simple regardless of the distance between the first lens group 38 and the second lens group 40 in the zoom down condition.

The coiled strip allows the stroke of the zooming apparatus to be maximized since a minimum of space is required.

The coiled strip-like intercepting member can be used for all optical apparatus having two or more lens groups which move relative to each other, such as in a zooming telescope, a camcorder or a zoom camera.

What is claimed is:

1. An optical apparatus comprising
a first lens group;
a second lens group disposed on a common longitudinal axis with said first lens group;
means for moving said first lens group relative to said second lens group between a retracted position with said lens groups in close relation and an extended zooming position in which said both lens groups are spaced apart from each other; and
a helically wound strip defining a light intercepting means between said lens groups to prevent incident light from passing therethrough into a space between said lens groups, said helically wound strip being extendable from a collapsed condition with said lens groups in said retracted position into an expanded condition with said lens groups in said extended position.

2. An optical apparatus as set forth in claim 1 wherein said helically wound strip has a plurality of concentric coils, an inner one of said coils being secured to said first lens group and an outer one of said coils being secured to said second lens group.

3. An optical apparatus as set forth in claim 2 wherein said helically wound strip is expandable along said common longitudinal axis from said collapsed condition.

4. An optical apparatus as set forth in claim 2 wherein said strip in an uncoiled flattened condition has a pair of parallel longitudinal edges and a pair of transverse edges angularly disposed relative to said longitudinal edge.

5. An optical apparatus as set forth in claim 4 wherein said strip has an edge at each end perpendicular to a respective transverse edge extending to one of said longitudinal edges.

6. An optical apparatus as set forth in claim 2 wherein said coils are collapsible into each other within an axial length of one of said coils.

7. An optical apparatus as set forth in claim 1 wherein said strip has a coating of non-reflective material to prevent reflection of light therefrom.

8. An optical apparatus as set forth in claim 1 further comprising a first barrel for mounting on a camera body and a movement lens barrel telescopically mounted in said first barrel and having said first lens group secured therein, said lens barrel being axially movable within said first barrel.

9. An optical apparatus as set forth in claim 8 which further comprises a shutter coaxially aligned with said first and second lens groups within said first barrel.

10. An optical apparatus as set forth in claim 8 which further comprises a first holder secured to said movement lens barrel and having said first lens group mounted therein and a second holder secured to said first barrel and having said second lens group mounted therein, said strip being secured at opposite ends thereof to said first and second holders.

11. An optical apparatus comprising
a first barrel;
a first lens group mounted in said first barrel in a fixed position relative thereto;
a second barrel telescopically mounted in said first barrel for movement relative to said first barrel and said first lens groups;
a second lens group disposed on a common longitudinal axis with said first lens group and mounted in said second barrel for movement therewith between a retracted position with said lens groups in close relation and an extended zooming position in which said both lens groups are spaced apart from each other; and
a helically wound strip defining a light intercepting means between said lens groups to prevent incident light from passing therethrough into a space between said lens groups, said strip being collapsible from an expanded condition with said lens groups in said extended retracted position into a collapsed condition with said lens groups in said retracted position.

12. An optical apparatus as set forth in claim 11 wherein said strip has a plurality of concentric coils, an inner one of said coils being secured to said first lens group and an outer one of said coils being secured to said second lens group.

13. An optical apparatus as set forth in claim 12 wherein said coils are collapsible into each other within an axial length of one of said coils and are disposed in overlapping relation in said expanded condition.

* * * * *